April 3, 1962   A. D. RISNES   3,027,778
BRAKE PEDALS
Filed May 6, 1960
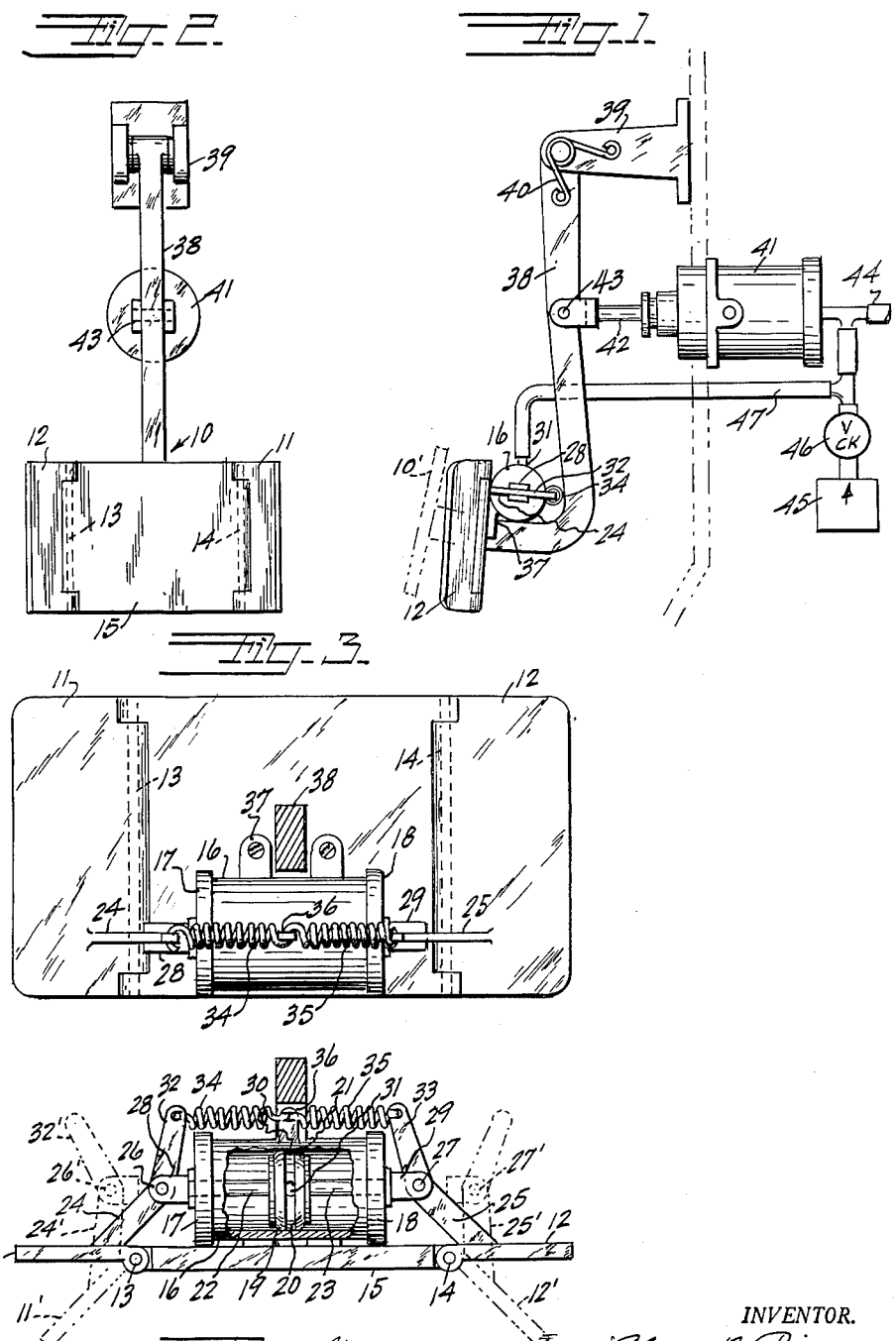
INVENTOR.
Alvin D. Risnes
BY Philip A. Sudell
Attorney

United States Patent Office 3,027,778
Patented Apr. 3, 1962

3,027,778
BRAKE PEDALS
Alvin D. Risnes, 725 Sycamore St., Oakland, Calif.
Filed May 6, 1960, Ser. No. 27,441
9 Claims. (Cl. 74—512)

This invention relates to improvements in brake pedals, and provides a safety grip foot brake which not only retains the foot on the brake pedal but actually positions the foot when the foot is not properly applied, thus providing for precise actuation of the brake.

As is well known, many accidents have occurred in automotive vehicles of various types due to improper positioning of the foot or slipping of the foot off the brake pedal, and which could have been prevented through the medium of a suitable safe-guard for the foot of the driver.

This invention is designed to provide such a safeguard, making certain that the foot will be properly positioned and retained in that position during operation of the brake, thereby eliminating one specific cause of accidents.

The objects and advantages of the invention are as follows:

First, to provide means actuated through initial depression of the foot pedal of an automotive vehicle brake for positioning and retaining the foot of a driver during a braking operation.

Second, to provide means as outlined which will prevent the foot from slipping off the brake pedal to thus avoid accidents.

Third, to provide means as outlined which is operated through the medium of the master brake cylinder with sequential operation of the brake when the brake pedal is depressed.

Fourth, to provide means as outlined which is relatively simple in construction, automatic in operation, and economical to manufacture.

In describing the invention reference will be had to the accompanying drawings, in which:

FIG. 1 is a side elevation of the invention.

FIG. 2 is a front elevation of FIG. 1.

FIG. 3 is a rear view of the invention drawn to an enlarged scale.

FIG. 4 is an end view of FIG. 3, shown partly in section.

The invention consists of a brake pedal 10 having a wing for each side indicated at 11 and 12 hinged respectively at 13 and 14 and capable of being moved angularly forward as indicated in dotted figures at 11' and 12', and including means for advancing the wings to the angular position with initial depression of the brake pedal 10 and/or wings 11 and 12, the foot being caused to slide over onto the main pad 15 if the foot should engage either wing followed by depression of the pedal, and when the foot is in proper position, the wings will function as guards.

The means for operating the tread wings 11 and 12 is illustrated as consisting of a cylinder 16 having a removable head at each end as indicated at 17 and 18 and having opposed pistons 19 and 20 which are provided with suitable packing such as the cup leathers 21, the pistons each having a plunger rod as indicated at 22 and 23, which project through the respective heads 17 and 18.

Each wing is provided with a lever arm as indicated at 24 and 25 to which the respective plunger rods are pivotally connected as indicated at 26 and 27 through the medium of yokes 28 and 29, which also function as stops for cooperation with the heads to limit retractive movement of the pistons for maintaining a space therebetween as indicated at 30 for passage of fluid therebetween from an intake and discharge passage 31.

The arms 24 and 25 may be mounted on or formed integral with the wings as shown, and each has an extension respectively 32 and 33, to which one end of the respective tension springs 34 and 35 are connected, the other ends of the springs being connected to the ear 36 shown formed on the cylinder.

The movement of the wings may be made to any desired angularity and shown with an angular movement of 45 degrees with the pivots 26 and 27 operating in the flattest part of the arc, 22½ degrees in respective directions from a perpendicular through the axis of the pivots 13 and 14, the pivot bearings being sufficiently free to compensate for the arcuate movement.

This cylinder is mounted on the back of the tread of the brake pedal as indicated at 37.

The pedal may be of any of the conventional types, and is shown in its simplest form in which the pedal arm 38 is suspendedly hinged to a bracket 39 and normally maintained in an advanced position by suitable urging means such as the spring 40.

The master cylinder 41 has a piston rod 42 which is pivotally connected to the pedal arm 38 as indicated at 43. This master cylinder has a connection 44 to the brakes of the automotive vehicle and also includes a fluid supply 45 controlled by a check valve 46 for maintaining the master cylinder and brake lines filled with fluid.

A branch connection 47 provides communication between the master cylinder and the tread wing operating cylinder through the passage 31.

The brake pedal is normally in the dotted position 10' with the piston rod 42 of the master cylinder fully retracted, and the tread wing operating cylinder having its pistons 19 and 20 also fully retracted as indicated in FIG. 4, with the wings 11 and 12 extending parallel with the treads, the springs 34 and 35 having just sufficient tension to fully retract the pistons and coincidently the wings.

With initial depression of the brake pedal, the pistons 19 and 20 are forced outwardly, moving the wings to the dotted positions 11' and 12', with further depression of the brake pedal actuating the vehicle brakes, thus initially providing side guards for the foot of the operator of the vehicle.

When the brake pedal is released, the wings do not retract until the brakes are released, since the tension of the retracting springs for the brakes is considerably greater than that of the wing retracting springs.

This invention is not limited to the exact structure and arrangement shown since the operation can be carried out by other means.

I claim:

1. A brake pedal having a tread, and side wings hingedly mounted on said tread and means normally maintaining said wings retracted in parallelism with the tread, and means cooperative with said wings and actuated through depression of the brake pedal for angularly advancing said wings to form positioning means for the foot and guards for the sides of the positioned foot of the operator of a vehicle.

2. A brake pedal having a tread, a side wing hingedly connected to each side of the tread, means normally maintaining said wings in a retracted position substantially in parallelism with the tread, means cooperative with said wings and actuated through initial depression of the brake pedal for angularly advancing said wings to project forwardly divergently toward the vehicle operator to form positioning means for the foot and guards for the sides of the positioned foot of the vehicle operator to provide for positive safety operation of the brake pedal.

3. A brake pedal having a tread, a wing hingedly connected to each side of the tread, means normally maintaining said wings in a retracted position, means cooperative with said wings and operable through initial depression of said brake pedal for advancing said wings to form angularly forwardly projecting guards to position and maintain the positioned foot of the driver of a vehicle on the tread during further operation of the brake pedal for braking the vehicle, for safe and positive actuation of the brake of the vehicle.

4. In an automotive vehicle having a brake pedal having a tread and including means normally maintaining said brake pedal in an advanced position, and having a master cylinder having a piston rod connected to said brake pedal and a supply of fluid for the master cylinder; safety braking means comprising a wing movably mounted on each side of the tread and including means normally maintaining said wings in a retracted nonobstructional position, power means having connection with said wings and with said master cylinder for advancing said wings to form angularly projecting foot positioning means and side guards for said tread and operable through initial depression of said brake pedal for operating the brakes of the vehicle.

5. A structure as defined in claim 4, said wings being hingedly connected to the side edges of said tread and normally maintained in parallelism therewith, with said power means having connection with the wings for angularly moving said wings from the retracted to the angularly projected position.

6. A structure as defined in claim 4, said wings being hingedly connected to the side edges of said tread and normally in parallelism therewith, said power means comprising a cylinder mounted on the back of said tread and having opposed pistons having piston rods operatively connected to said wings, with said master cylinder having connection centrally of the length of the cylinder between the opposed pistons, and including means maintaining spacing between the pistons when in retracted position for reception of fluid from the master cylinder.

7. A structure as defined in claim 4, said wings being hingedly connected to the side edges of said tread and having each a rearwardly projecting lever arm, said power means comprising a cylinder mounted on the back of said tread and having opposed pistons each having a piston rod, with the respective piston rods having connection with the respective rearwardly projecting lever arms, and said master cylinder having communication with said cylinder between the retracted pistons.

8. A brake pedal having a tread having side edges, a master cylinder having a piston rod connected to said brake pedal and having a brake connection, a wing hingedly mounted on each side edge of said tread and each having a rearwardly projecting lever arm terminating in a spring arm, a cylinder mounted on the back of said tread and having a communicating connection centrally of the length to said master cylinder, and having opposed pistons each having a piston rod with the piston rods connected to the respective rearwardly projecting lever arms, and means limiting retraction of said pistons to maintain fluid communication therebetween from said communicating connection, and tension springs having connections between the cylinder and the respective spring arms for normally retracting the wings.

9. A brake pedal having a tread and means normally maintaining the brake pedal in an advanced operable position, a wing hingedly mounted on each side of said tread, a cylinder mounted on the back of the tread, opposed pistons in said cylinder and each having a connecting rod and respectively operatively connected to the respective wings, means normally maintaining the pistons and wings in a retracted position with the wings substantially in parallelism with the tread, and a communicating connection intermediate the length of the cylinder between the opposed pistons for connection to the master cylinder of a brake system or the like, with the wings movable to a forwardly divergent position for guiding the foot of the operator of the brake onto the tread when the pistons are actuated upon initial depression of the brake pedal by the foot.

References Cited in the file of this patent

UNITED STATES PATENTS

| | | |
|---|---|---|
| 1,305,143 | Marston | May 27, 1919 |
| 2,225,423 | Pomernacki | Dec. 17, 1940 |
| 2,792,721 | Di Giovanni | May 21, 1957 |
| 2,871,999 | Hemphill | Feb. 3, 1959 |